United States Patent
Chen

(10) Patent No.: US 7,698,825 B2
(45) Date of Patent: Apr. 20, 2010

(54) AUTOMATIC SOLAR COMPASS

(75) Inventor: Chengjun Julian Chen, White Plains, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 257 days.

(21) Appl. No.: 11/840,500

(22) Filed: Aug. 17, 2007

(65) Prior Publication Data

US 2009/0044418 A1  Feb. 19, 2009

(51) Int. Cl.
*G04B 49/00* (2006.01)
*G01C 17/34* (2006.01)

(52) U.S. Cl. ......................................... 33/269; 33/270

(58) Field of Classification Search ........... 33/268–270, 33/1 DD, 1 CC
See application file for complete search history.

(56) References Cited

U.S. PATENT DOCUMENTS

| | | | | |
|---|---|---|---|---|
| 4,373,270 A | * | 2/1983 | Ousley | 33/270 |
| 4,384,408 A | * | 5/1983 | Bohlayer | 33/270 |
| 4,835,875 A | * | 6/1989 | Fuller | 33/270 |
| 5,056,232 A | * | 10/1991 | Cunningham | 33/269 |
| 5,425,178 A | | 6/1995 | Steele | |
| 6,810,594 B2 | | 11/2004 | Lucarini et al. | |
| 6,947,351 B1 | | 9/2005 | Loth et al. | |
| 7,075,048 B2 | * | 7/2006 | Gal et al. | 250/206.1 |
| 7,555,840 B2 | * | 7/2009 | Chen | 33/269 |
| 2004/0104334 A1 | * | 6/2004 | Gal et al. | 250/203.6 |
| 2005/0041094 A1 | * | 2/2005 | Gal et al. | 348/36 |
| 2005/0167570 A1 | * | 8/2005 | Gal et al. | 250/206.1 |
| 2008/0127964 A1 | | 6/2008 | Han | |

OTHER PUBLICATIONS

North American Sundial Society Compendium, "Sundials Using An Omnidirectional Lens," by C. Julian Chen, vol. 14, No. 4, Dec. 2007.

* cited by examiner

*Primary Examiner*—Yaritza Guadalupe-McCall
(74) *Attorney, Agent, or Firm*—Wiggin and Dana LLP; Anthony P. Gangemi

(57) ABSTRACT

The most accurate method of finding the true north is through astronomical observations, for example, by observing the position of the sun. However, the procedure is complicated. The instantaneous position of the sun must be calculated from astronomical data for each instance of observation, and the operator must wait for the predetermined time to come. Elaborate manual adjustments are required. The present invention discloses an automatic solar compass comprising a cylindrical omni-directional lens, a detection means, and a servomechanism. It is as easy to use as the magnetic compass, but much more accurate and reliable than the magnetic compass.

9 Claims, 5 Drawing Sheets

Side Views
(with case open)

Top View

AUTOMATIC SOLAR COMPASS

BACKGROUND OF THE INVENTION

1. Field of the Invention

Finding the direction with regard to the true north is a necessity in everyday life, for example, in traveling, camping, sightseeing, driving, sailing, flying, exploration, land surveying, military activities, and the utilization of solar energy. Since the invention in the $11^{th}$ century, the magnetic compass has been the most popular instrument for finding directions. It is well-known that the magnetic compass has a number of problems. The magnetic north is often grossly different from the true north. In the United States, the error (magnetic inclination) could be greater than ±20°, which also varies with location and time. In Canada, the error could be greater than ±45°. Furthermore, the magnetic compass is grossly affected by ferromagnetic materials in the neighborhood of the compass, for example, iron ore or steel pieces, such as vehicles and firearms.

The current invention discloses a novel compass which can automatically point to the true north based on the position of the sun, which is as easy to use as the magnetic compass, but much more reliable and accurate.

2. Description of the Prior Art

In 1834, W. A. Burt invented a solar compass which uses the position of the sun to determine the true north. Because of its reliability and accuracy, since the middle of the $19^{th}$ century, the US government defined the solar compass as the standard for land surveying. The solar compass is also used in the military for finding directions in the battle field, for example, the Astro Compass MKII was used extensively in WWII, the Korean War, and the Vietnam War. Recent improvements of the solar compass were disclosed, for example, in U.S. Pat. No. 4,899,451 by Dandurand, and U.S. Pat. No. 5,424,178 by Steele et al., and U.S. Pat. No. 5,459,931 by Waltho. However, the operation of those solar compasses is very complicated, which requires the calculation of the local solar time versus the local standard time at the time of measurement, and requires elaborate manual adjustments. When a gnomon is used, the image is fussy, and the equation of time correction must be accounted for. Therefore, to date, the solar compass is used only by few experts.

The advance of GPS (Global Positioning System) greatly facilitates the measurement of the location (longitude, latitude, and altitude). However, the GPS signal does not contain direction information. To find the direction of a line, at least two GPS points are required. To achieve sufficient accuracy, a distance of hundreds of feet is necessary. The direction is computed from the difference of the individual positions. Although very accurate, its application is complicated and time-consuming.

In a previous patent application (Ser. No. 11/840,428, 08/17/2007 by Chengjun Julian Chen), the present inventor discloses a new type of optical device, the spherical omni-directional lens, which can focus the sun beam from all directions onto a sharp spot with a long depth of field, with an application to an accurate and easy-to-use solar compass. Although it is much more convenient than the earlier solar compasses, it still requires manual adjustments to find the true north.

SUMMARY OF THE INVENTION

The current invention uses a cylindrical omni-directional lens to project the sunlight to a sharp and narrow line of light on an array of photo-detectors arranged on a semicircular base. The cylindrical omni-directional lens and the photo-detector array are contained in a light-tight case to become a detector assembly. If the axis of the detector assembly is aligned perfectly to the true south (or equivalently, true north), the location of the focused sunlight on the photo-detector array can be predicted accurately based on the date of the year, the local time, the latitude and longitude of the location, and the astronomical data. If there is a deviation between the detected location and the predicted location, the deviation is sent to a servomechanism, and a torque is generated to rotate the detector assembly to align it with the true south (or equivalently, true north). Once the deviation is eliminated, the axis is aligned to the true south (and equivalently the true north), the detection assembly becomes stationary, and then the true north is found.

The preferred method of applying a torque is to use the magnetic force. A permanent magnet is attached to the detection assembly. The entire detection assembly with the magnet is floating in a liquid cell, thus it is leveled and can rotate freely. When the servomechanism is turned off, the entire device is a magnetic compass. Two sets of coils made of insulated copper wires, perpendicular to each other, are attached on the walls of the liquid cell. By applying two independent direct-current (dc) electrical currents to the two coils, a magnetic field of any horizontal direction can be generated, depending on the directions and magnitudes of the electrical currents flowing through the two coils. Engineering computation shows that with one watt of electrical power on the copper-wire coils, a magnetic field five times greater than the earth's magnetic field can be generated. The permanent magnet attached to the detection assembly will respond to the artificial magnetic field as if it is the earth's magnetic field.

Therefore, the operation of the said automatic solar compass is as easy as a magnetic compass. If the power is turned off or there is no sunlight, it functions as a magnetic compass. When the power is turned on and there is sunlight, the compass automatically points to the true north if it is different from the magnetic north.

DESCRIPTION OF THE PREFERRED EMBODIMENTS

Figure 1:
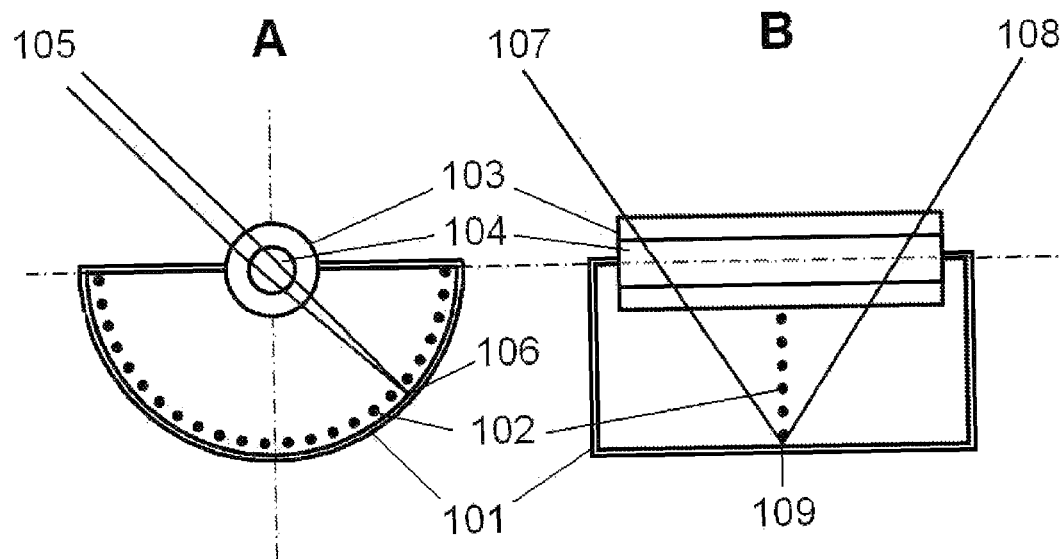
FIG. 1 shows the detector assembly.
Figure 1:
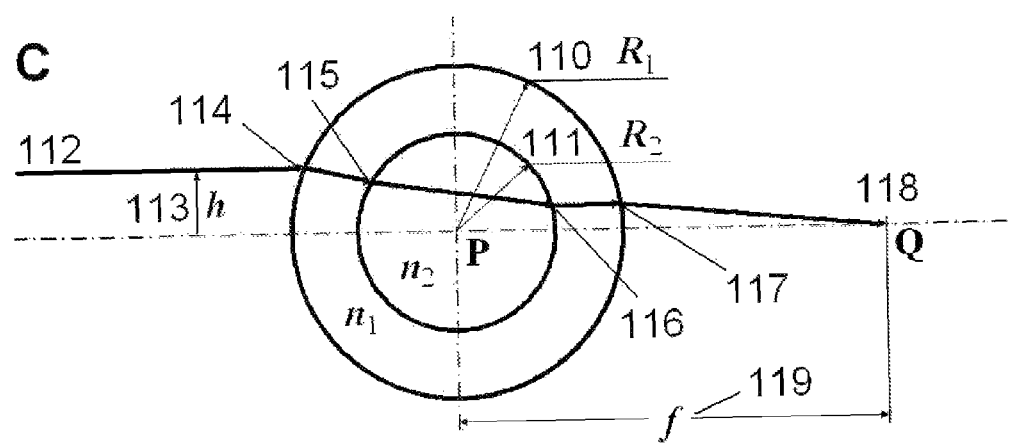

FIG. 1A and B show two cross sections of the detector assembly. It has an opaque and light-tight case 101. An array of photo-detectors 102 is placed at the middle of the case, to form a semi-circle. On the top side of the detector assembly is a cylindrical omni-directional lens, comprises of an outer cylinder 103 and an inner (solid) cylinder 104. The parallel light beams 105 of the sunlight converge at a point 106 on one of the photo-detectors placed on the inner wall of the semi-cylindrical case 101. The length of the cylindrical lens is sufficiently large that the sunlight over more than 47° angle span, 107 to 108, can be projected onto the photo-detector array 102.

The principle of the cylindrical omni-directional lens is shown in FIG. 1C. It comprises two concentric cylindrical components. The outer cylinder 110 with radius $R_1$ is made of a transparent material with index of refraction $n_1$. The inner cylinder 111 with radius $R_2$ is made of another transparent material of index of refraction $n_2$. When a light beam 112 impinges on the lens with an offset h from the axis, owing to the difference in the index of refraction, the beam is refracted four times on the four surfaces, 114, 115, 116, and 117. Detailed mathematical analysis shows that under the conditions $n_1 > n_2$ and $$\frac{R_2}{R_1} > \frac{n_1 - n_2}{(n_1 - 1)n_2},$$

all rays with the same h will converge on a line Q (118) parallel to the axis P of the cylinder with a finite distance f (119). In general, for rays with different h, the focal length f is different. Since the rays with the same offset h converge at the same line Q (118) parallel to the axis of the cylinder, it creates a line of light with very high intensity. However, all the rays with different h will be divergent and have much lower intensity comparing with that of the central line of light. Because the lens is cylindrically symmetric, parallel light rays coming from any direction will be focused the same way. Therefore, the effect of light focusing is omni-directional, which can project the sunlight from any direction into a sharp and narrow line. And the depth of field is large.

Figure 2:
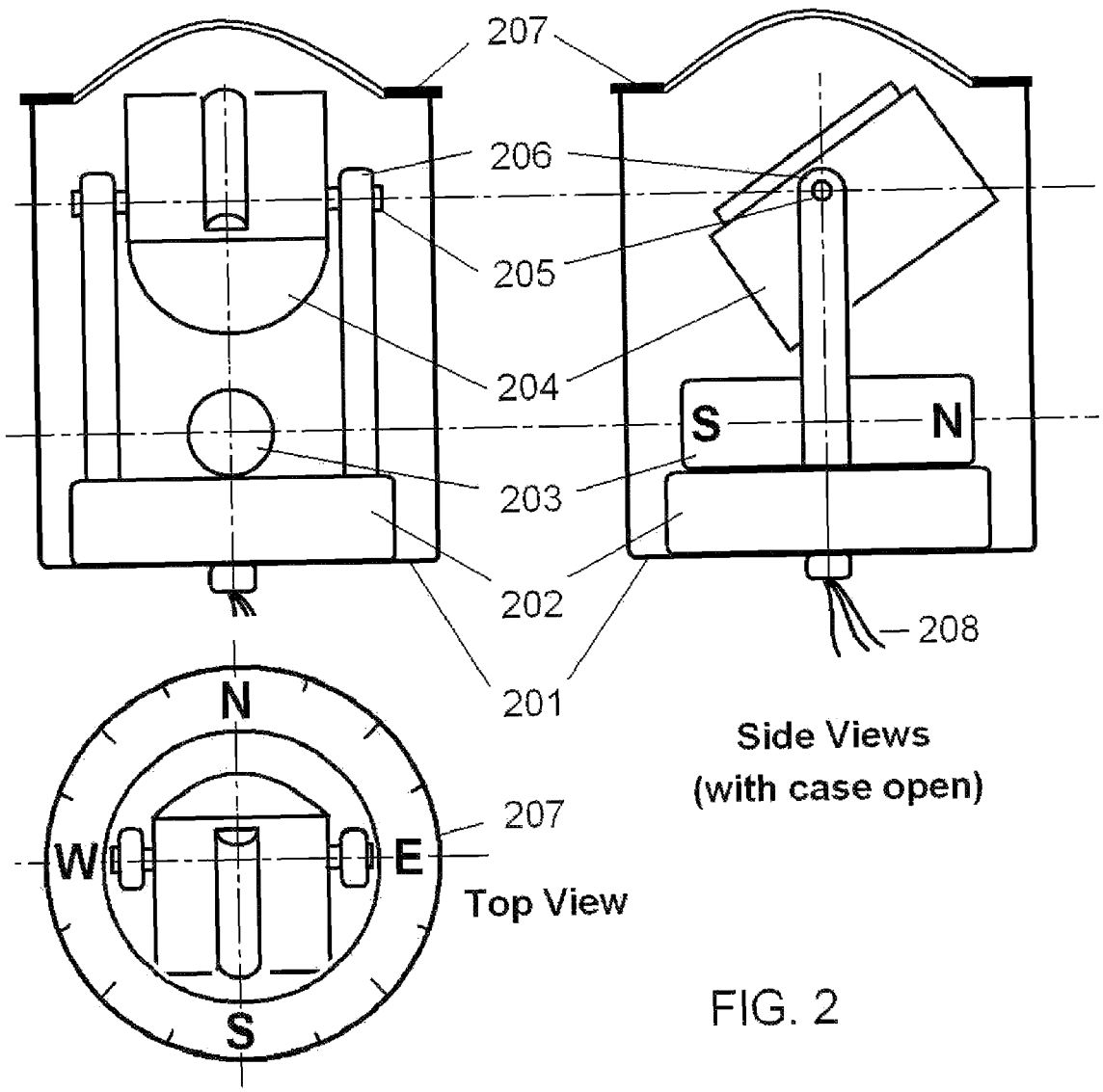
FIG. 2 shows detector assembly with the magnet.

The rotating unit of the compass is shown in FIG. 2. A water-tight case 101 contains a base plate 202 for the assembly, which is also the weight to keep the balance when it is floating. A permanent magnet 203 is secured on the base plate 202. The detector assembly, 204, is allowed to rotate around an axis 205, located at the center of weight of the detector, supported by the columns 206. The angle of inclination should be adjusted according to the latitude of the location, but the adjustment is required only when the latitude change is significant. The cover 207 has a hemispherical transparent window at the center and direction readings on the peripheral, as shown in the Top View of FIG. 2. The wires 208 are used to access the photo detectors.

Figure 3:
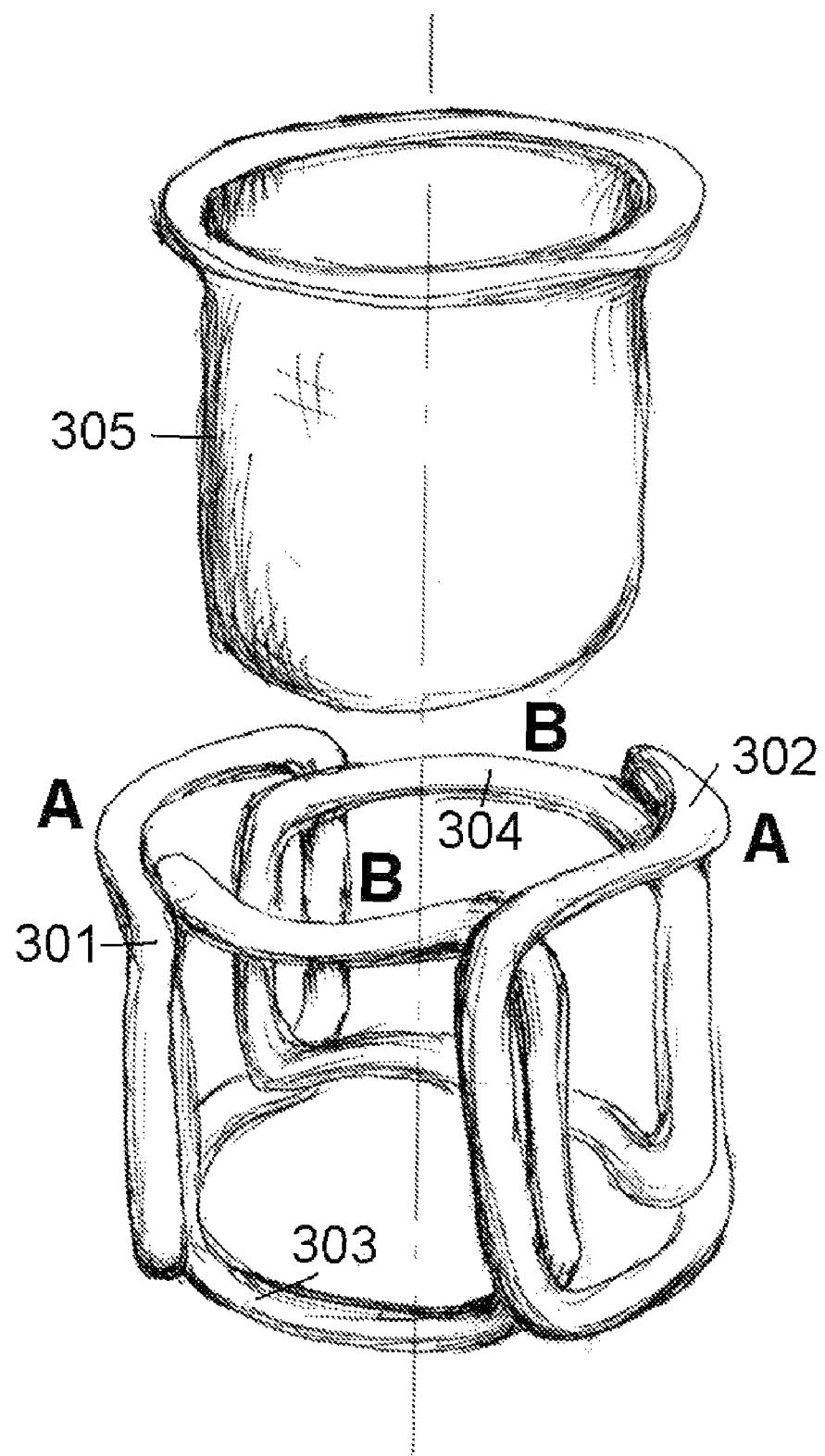
FIG. 3 shows the coils on the liquid cell.

The rotating unit is floated by the liquid in a container, which has a pair of coils attached, see FIG. 3. Set A, 301 and 302, are connected and have the same current direction. Set B, 303 and 304, are also connected. The magnetic fields generated by the two sets of coils are perpendicular to each other. By adjusting the polarities and magnitudes of the two electric currents, magnetic field of any horizontal direction can be generated. Using a 500-turn coil made of 0.5 mm diameter copper wire, with a 3 V power supply, the magnetic field thus generated is about 5 times stronger than the earth's magnetic field.

Figure 4:
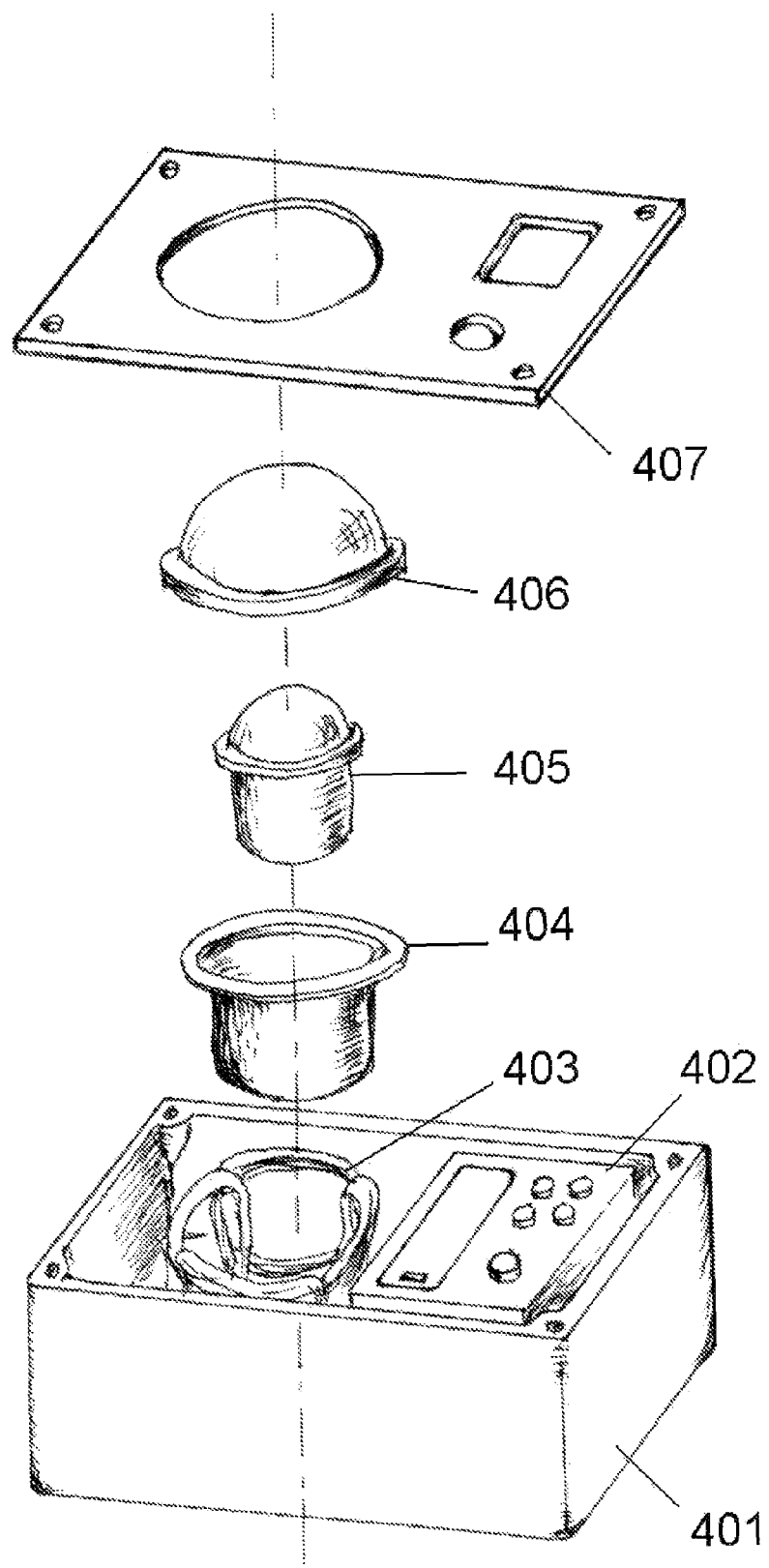
FIG. 4 shows a perspective view of the solar compass.

FIG. 4 is an assembly diagram of the entire instrument, contained in a rectangular metal box 401. The electronics unit 402 comprises a measurement circuit and servomechanism, a battery, a power switch, and control buttons. The coils 403 are attached to the container 404, which is filled with a viscous liquid. The rotating unit 405 is supported by floating on the liquid and a pivoting point at the bottom. The container is sealed by a transparent hemispherical cover 406. Without power, the rotating unit aligns with the earth's magnetic field. With power on, it aligns with the magnetic field generated by the coils.

Figure 5:
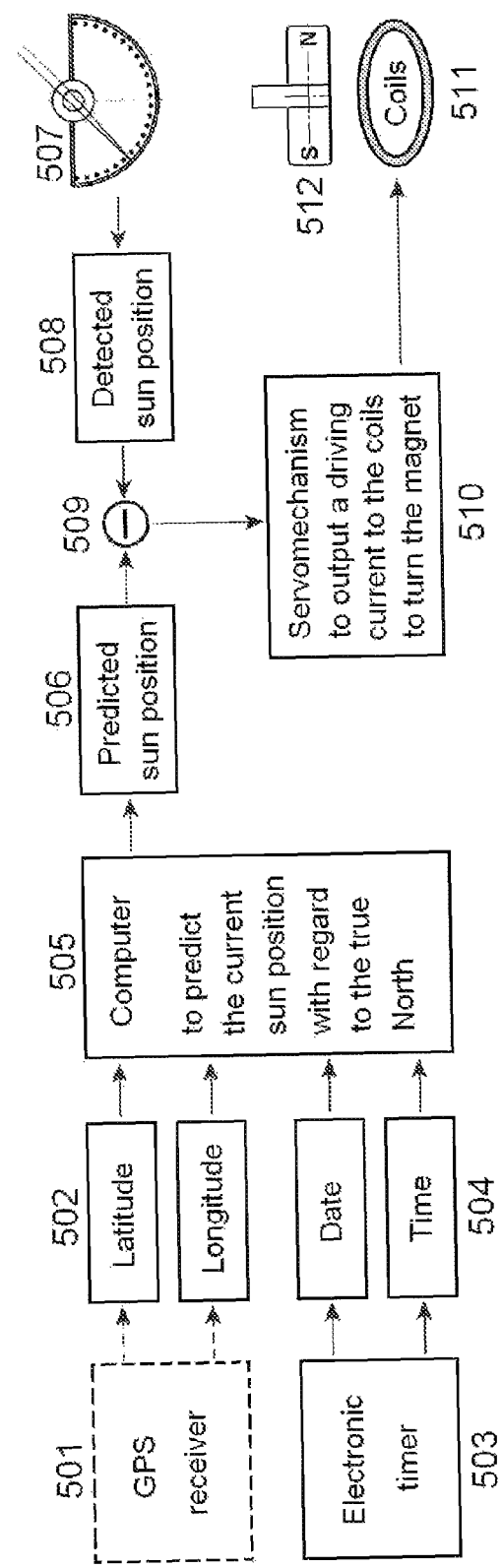
FIG. 5 shows a block diagram of its function.

FIG. 5 is a block diagram of its operation. To compute the current sun position, four types of data are required: the latitude and longitude of the location, the date in the year, and the time of the day. The latitude and longitude of the location found from an ordinary map is sufficiently accurate. However, optionally, a GPS receiver 501 is used to obtain the values of latitude and longitude 502 automatically. The date and time 504 can be determined from an electronic timer 503; for example, the timer in a microcomputer. The set of data is sent to a microcomputer 505 to calculate the current sun position 506 with regard to the true North. One the other hand, the detector 507 detects the current sun position 508 with regard to the orientation of the detector assembly, which is not necessarily aligned to the true North. The deviation is sent to a servomechanism 510, which then outputs driving currents to the coils 511. The magnetic field of the coils 511 then turns the magnet to align the detector to the true North, such that the deviation is eliminated. By then, the true North is found and displayed.

The invention claimed is:

1. An omni-directional cylindrical lens including two or more concentric cylindrical components fabricated from transparent materials, said lens comprising:
   an outer cylinder having an outer radius $R_1$, an inner radius $R_2$, and an index of refraction $n_1$; and
   an inner (solid) cylinder having a radius $R_2$ and an index of refraction $n_2$;
   wherein said lens is configured such that a parallel beam of light impinging on said lens converges to a sharp line of light on a side of said lens with a focal length f.

2. An automatic solar compass comprising:
   an omni-directional cylindrical lens according to claim 1 to project the sunlight into a sharp line of light;
   detection means to detect a position of said sharp line of light, said detection means configured to rotate freely in a horizontal plane together with said omni-directional cylindrical lens;
   means to determine a date of a year and a time of a day;
   a computation means to calculate a position of the sun with respect to the true north at the date, time, and a latitude and a longitude of a location of measurement;
   a servomechanism to compare a detected position of the sun and the calculated position of the sun and to correct an orientation of the detection means to match; and
   display means to point to the true north as determined.

3. The automatic solar compass in claim 2 further comprising a photo-detector array arranged on a semicircular base to determine a position of the sun.

4. The automatic solar compass in claim 2 further comprising a liquid cell for floating the detection means.

5. The automatic solar compass in claim 2 further comprising a permanent magnet to use as a magnetic compass and to respond to a force from the servomechanism, said force being generated through coils with an electrical current.

6. The automatic solar compass in claim 2 further comprising a microcomputer to compute a position of the sun with respect to the true north with the date, time, and the latitude and longitude of a location of measurement.

7. The automatic solar compass in claim 2 further comprising a global positioning system receiver to determine a local latitude and longitude for computation of a position of the sun.

8. The automatic solar compass in claim 2 further comprising a miniature motor to rotate the detection means around an axis.

9. The lens according to claim 1 further comprising a glass or transparent plastic outer cylinder and an aqueous solution forming the inner cylinder.

* * * * *